United States Patent Office 3,360,551
Patented Dec. 26, 1967

3,360,551
CARBOXYLATION OF GRIGNARD REAGENTS IN THE PRESENCE OF LIQUID $CO_2$
David Regenbogen, Fair Lawn, N.J., assignor to M & T Chemicals Inc., New York, N.Y., a corporation of Delaware
No Drawing. Filed Sept. 3, 1963, Ser. No. 306,279
5 Claims. (Cl. 260—515)

This invention relates to a novel process for preparing organic chemicals. More particularly it relates to the carboxylation of organic compounds.

As is well known to those skilled-in-the-art, various chemical compounds may be reacted with carbon dioxide to produce other chemical compounds; for example, Grignard reagents, RMgX, may be reacted with carbon dioxide to produce organic carboxylic acids. Typically, phenyl magnesium chloride may be reacted with carbon dioxide to form a Grignard adduct which upon hydrolysis may be readily converted to benzoic acid.

The carboxylation of Grignard reagent may be effected by passing gaseous carbon dioxide through a body of Grignard reagent, either in pure form or more commonly in solution in appropriate solvent. Alternatively, it is common to provide carbon dioxide by the use of so-called Dry Ice i.e. solid carbon dioxide.

It is well known that neither of these techniques which provide carbon dioxide to the solution is fully satisfactory. The yield obtained during this reaction may be undesirably low unless substantial excess of carbon dioxide is present and the reaction carried out over an extended period of time. When the reaction is carried out by prior art techniques, yields of 10%–30% may be obtained. It appears that the reaction rate may be diffusion controlled and limited in practice by the difficulty of passing gaseous carbon dioxide across the barrier between the gas phase and the liquid phase.

The typical reaction of this type is exothermic and as the reaction proceeds, the temperature of the reaction medium may increase substantially. Cooling must be provided during the reaction in order to effect proper control and to minimize loss by volatilization of components of the reaction mixture. It is a further characteristic of these reactions that the increase in temperature lowers the effective rate of reaction and the yield because inter alia of tar formation and polymerization. Accordingly, it has been common to conduct these reactions under conditions which are less than advantageous; and the large amount of cooling required has imposed upon this step an undesirable uneconomic burden.

It is an object of this invention to permit carboxylation of Grignard reagents to be carried out under highly desirable self-regulating conditions. It is a further object of this invention to permit carboxylation to occur under conditions which are conducive to attainment of high yield in minimum time. Other objects will be apparent to those skilled-in-the-art from the following description.

In accordance with certain of its aspects, the method of this invention for preparing a carboxylated Grignard reagent comprises reacting said Grignard reagent with carbon dioxide in a reaction mixture; maintaining a body of liquid carbon dioxide in contact with said reaction mixture during said reaction; volatilizing carbon dioxide from said body of liquid carbon dioxide into said reaction mixture thereby extracting heat from said reaction mixture and maintaining said reaction mixture at controlled temperature; and withdrawing product carboxylated Grignard reagent from said reaction mixture.

The Grignard reagents or compounds which may be carboxylated in accordance with the practice of certain embodiments of this invention may be prepared by the reaction of magnesium and organic halide or by other well-known techniques. Typical of the Grignard reagents which may be carboxylated in practice of this invention may be those having the formula RMgX, sometimes alternatively shown as $R_2Mg \cdot MgX_2$.

In the Grignard reagent, RMgX, X may be halogen, and preferably halogen selected from the group consisting of chloride and bromide.

In the formula RMgX, R may be a hydrocarbon radical typically selected from the group consisting of alkyl, aryl, alkaryl, aralkyl, alkenyl, cycloalkyl, and cycloalkenyl. Typical alkyl radicals may include ethyl, methyl, n-propyl, i-propyl, n-butyl, i-butyl, sec-butyl, amyl, hexyl, octyl, nonyl, lauryl, stearyl, etc. Typical aryl radicals may include phenyl, substituted phenyl, etc. Typical aralkyl radicals may include benzyl, ω-phenylpropyl, etc. Typical alkaryl radicals may include tolyl, ethylphenyl, xylyl, etc. Typical alkenyl radicals may include allyl, cinnamyl, butenyl, oleyl, etc. Typical cycloalkyl radicals may include cyclohexyl, etc. Typical cycloalkenyl radicals may include cyclohexenyl, etc. The preferred R radicals may include β-phenylethynyl.

Illustrative Grignard reagents which may be treated by the process of this invention may include propyl magnesium chloride; butyl magnesium bromide; octyl magnesium chloride; tolyl magnesium chloride; phenyl magnesium bromide; benzyl magnesium chloride; etc.

It is a particular feature of this invention that it may permit attainment of unexpectedly high yields when the Grignard reagent to be carboxylated may be β-phenylethynyl magnesium halide, preferably chloride,

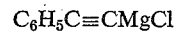
$$C_6H_5C \equiv CMgCl$$

The Grignard reagent may be employed in substantially pure form if desired. It is common to prepare and to use Grignard reagents in solution in an inert diluent or solvent. Typically the inert diluent or solvent may be ethyl ether, tetrahydrofuran, etc. Typical of the Grignard reagents which may be employed may be those disclosed in U.S. Patent 2,959,596.

The preferred Grignard reagent which may be treated in the practice of this invention, β-phenylethynyl magnesium chloride, may preferably have been prepared by the reaction of methyl magnesium chloride (typically in tetrahydrofuran) with phenyl acetylene to yield by product methane in addition to the desired Grignard reagent produced by this transmetalation reaction:

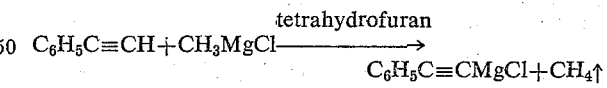
$$C_6H_5C\equiv CH + CH_3MgCl \xrightarrow{\text{tetrahydrofuran}} C_6H_5C\equiv CMgCl + CH_4\uparrow$$

Grignard reagent may be placed within a reaction vessel in the amount corresponding to one equivalent thereof. There may also be added to the reaction vessel liquid carbon dioxide typically in amount of about 2 equivalents thereof. The reaction vessel may be maintained during reaction at pressure of 0–10 p.s.i.g., preferably 5–10 p.s.i.g., say 5 p.s.i.g. at the preferred reaction temperature of 0° C.–10° C., preferably 0° C.–5° C., say 0° C.

As the Grignard reagent, typically in inert diluent or solvent, and the body of liquid carbon dioxide are maintained in the reaction mixture, carbon dioxide may pass from the liquid phase of carbon dioxide into the gas phase and thence into contact with the Grignard reagent where it reacts according to the following reaction:

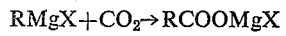
$$RMgX + CO_2 \rightarrow RCOOMgX$$

When the preferred β-phenylethynyl magnesium chloride is carboxylated, the reaction may be

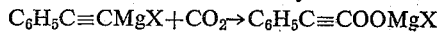
$$C_6H_5C\equiv CMgX + CO_2 \rightarrow C_6H_5C\equiv COOMgX$$

During the course of the carboxylation reaction, the heat liberated by the reaction may volatilize the liquid carbon dioxide. It is a feature of this invention that the exothermic heat of reaction may be substantially equivalent to the amount of latent heat required to volatilize carbon dioxide whereby the temperature of reaction may be maintained substantially constant within the hereinbefore noted limits.

Reaction which occurs between Grignard reagent and carbon dioxide may typically proceed over the course of 1–5 hours, preferably 2–4 hours, say 3 hours. During this period, as the volatilizing carbon dioxide removes latent heat from the system, the reaction may proceed smoothly toward completion.

In the preferred embodiment, the desired carboxylated product may be obtained in a substantially stoichiometric yield. It may be withdrawn from the reaction mixture, or as is more common, hydrolyzed in situ by addition of a hydrolyzing agent. This may be effected by addition of an aqueous solution of caustic or preferably acetic or hydrochloric acid in amount sufficient to convert the commonly obtained acid salt to the free acid. Typically this may occur as follows:

$$RCOOMgX + H_2O \xrightarrow{HCl} RCOOH + Mg(OH)X$$

or specifically:

$$C_6H_5C\equiv C-COOMgX + H_2O \xrightarrow{HCl} C_6H_5C\equiv C-COOH + Mg(OH)X$$

The free acid may be separated from the reaction mixture by filtration and washing to separate it from the by product, typically magnesium hydroxy chloride.

Further details of this invention will be apparent from the following illustrative examples wherein all parts are parts by weight unless otherwise specified.

*Example I*

160.5 parts of β-phenylethynyl magnesium chloride in 739.5 parts of toluene may be added to a reaction vessel, and the reaction mixture cooled to 0° C. by refrigeration. 125 parts of liquid carbon dioxide may then be added slowly to the vessel at pressure of 5 p.s.i.g.–10 p.s.i.g. and temperature of 0° C.–5° C. The reaction mixture may be agitated for two hours at 0° C.–5° C. during which time carboxylation may give the chloro magnesium salt of phenylpropiolic acid according to the following reaction:

$$C_6H_5C\equiv CMgCl + CO_2 \rightarrow C_6H_5C\equiv C-COOMgCl$$

At the conclusion of the reaction, there may be added to the reaction vessel, now vented to the atmosphere, 600 parts of 18% hydrochloric acid. The reaction mixture may be agitated for two hours, after which 250 parts of water may be added while maintaining the reaction mixture at less than 20° C. During this period, the following reaction may occur:

$$C_6H_5C\equiv C-COOMgCl + H_2O \rightarrow C_6H_5C\equiv C-COOH + Mg(OH)Cl$$

The pH of the water phase at the end of the addition may be 1.0. After agitation for 30 minutes and settling for 15 minutes, the supernatant organic phase may be withdrawn from the reaction vessel. It may be found that this phase contains 132 parts of phenylpropiolic acid in toluene. If desired, the pure acid may be recovered by extraction with an aqueous solution of caustic soda, with subsequent treatment of this aqueous layer with acid, e.g. hydrochloric acid, to precipitate phenylpropiolic acid in yield of 90%. If desired, this toluene solution of phenylpropiolic acid may be alternately otherwise treated as desired, e.g. esterified, etc.

*Example II*

181 parts of phenyl magnesium bromide in 300 parts of tetrahydrofuran may be added to a reaction vessel. The reaction mass may be cooled to 0° C. by refrigeration and liquid carbon dioxide in amount of 88 parts added. The vessel may be maintained at pressure of 5–10 p.s.i.g. and temperature of 0° C.–10° C. The reaction mixture may be agitated for two hours during which time the following reaction may occur:

$$C_6H_5MgBr + CO_2 \rightarrow C_6H_5COOMgBr$$

The mixture may then be vented to atmospheric pressure, 98 parts of 50% sulfuric added. As agitation is carried out over two hours at temperature of about 18° C., the following reaction may occur:

$$C_6H_5COOMgBr + H_2O \rightarrow C_6H_5COOH + Mg(OH)Br$$

After settling for 15 minutes, the supernatant organic phase may be withdrawn from the reaction vessel. Pure benzoic acid may be recovered by extraction with aqueous solution of caustic soda, with subsequent treatment of the aqueous layer with dilute 10% sulfuric acid. Product benzoic acid (M.P. 121° C.–123° C.) may be recovered in yield of 90%.

It will be apparent to those skilled-in-the-art that various changes and modifications may be made which come within the scope of this invention.

I claim:

1. The method of preparing a carboxylated Grignard reagent which comprises reacting said Grignard reagent with carbon dioxide in a reaction mixture; maintaining a body of liquid carbon dioxide in contact with said reaction mixture during said reaction; volatilizing carbon dioxide from said body of liquid carbon dioxide into said reaction mixture thereby extracting heat from said reaction mixture and maintaining said reaction mixture at controlled temperature; and withdrawing product carboxylated Grignard reagent from said reaction mixture.

2. The method of preparing a carboxylated Grignard reagent as claimed in claim 1 wherein said reaction mixture is maintained at 0–10 p.s.i.g. and 0° C.–10° C.

3. The method of carboxylating β-phenylethynyl magnesium halide which comprises reacting said β-phenylethynyl magnesium halide with carbon dioxide in a reaction mixture; maintaining a body of liquid carbon dioxide in contact with said reaction mixture during said reaction; volatilizing carbon dioxide from said body of liquid carbon dioxide into said reaction mixture thereby extracting heat from said reaction mixture and maintaining said reaction mixture at controlled temperature; and withdrawing product from said reaction mixture.

4. The method of claim 3 wherein said withdrawn product is further hydrolyzed thereby forming phenylpropiolic acid.

5. The method of preparing phenylpropiolic acid which comprises reacting β-phenylethynyl magnesium halide with carbon dioxide in a reaction mixture; maintaining a body of liquid carbon dioxide in contact with said reaction mixture during said reaction; maintaining said reaction mixture at 0–10 p.s.i.g. and 0° C.–10° C. during said reaction; volatilizing carbon dioxide from said body of liquid carbon dioxide into said reaction mixture thereby extracting heat from said reaction mixture and maintaining said reaction mixture at controlled temperature of 0° C.–10° C.; and withdrawing product phenylpropiolic acid from said reaction mixture.

References Cited

Gilman, H.: Organic Chemistry, vol. I, pp. 505–506, John Wiley & Sons, New York, N.Y., 1943.

LORRAINE A. WEINBERGER, *Primary Examiner.*

RICHARD K. JACKSON, *Examiner.*

T. L. GALLOWAY, *Assistant Examiner.*